United States Patent
Jenne et al.

(10) Patent No.: US 8,904,514 B2
(45) Date of Patent: Dec. 2, 2014

(54) IMPLEMENTING A HOST SECURITY SERVICE BY DELEGATING ENFORCEMENT TO A NETWORK DEVICE

(75) Inventors: Nathan Stanley Jenne, Lincoln, CA (US); Shaun Kazuo Wakumoto, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/640,399

(22) PCT Filed: Apr. 12, 2010

(86) PCT No.: PCT/US2010/030755
§ 371 (c)(1),
(2), (4) Date: Oct. 10, 2012

(87) PCT Pub. No.: WO2011/129809
PCT Pub. Date: Oct. 20, 2011

(65) Prior Publication Data
US 2013/0031621 A1 Jan. 31, 2013

(51) Int. Cl.
*H04L 29/06* (2006.01)
*G06F 17/30* (2006.01)

(52) U.S. Cl.
CPC ............ *H04L 63/02* (2013.01); *H04L 63/0227* (2013.01); *G06F 17/30699* (2013.01)
USPC ............................................ 726/13; 713/154

(58) Field of Classification Search
CPC ....................... H04L 63/0227; G06F 17/30699
USPC .......................................................... 726/13
See application file for complete search history.

(56) References Cited

U.S. PATENT DOCUMENTS

| | | | | |
|---|---|---|---|---|
| 6,018,519 A | * | 1/2000 | Ginzboorg | 370/236 |
| 7,185,192 B1 | * | 2/2007 | Kahn | 713/155 |
| 7,409,707 B2 | * | 8/2008 | Swander et al. | 726/13 |
| 7,409,709 B2 | | 8/2008 | Smith et al. | |
| 7,475,424 B2 | * | 1/2009 | Lingafelt et al. | 726/13 |
| 7,516,487 B1 | | 4/2009 | Szeto et al. | |
| 2003/0051026 A1 | | 3/2003 | Carter et al. | |
| 2003/0204632 A1 | * | 10/2003 | Willebeek-LeMair et al. | 709/249 |
| 2004/0122977 A1 | * | 6/2004 | Moran et al. | 709/246 |
| 2006/0212932 A1 | | 9/2006 | Patrick et al. | |
| 2007/0071011 A1 | | 3/2007 | Heer et al. | |
| 2007/0150951 A1 | | 6/2007 | Aaron et al. | |
| 2008/0155647 A1 | * | 6/2008 | Miyawaki et al. | 726/1 |
| 2008/0289027 A1 | | 11/2008 | Yariv et al. | |

(Continued)

OTHER PUBLICATIONS

Foundry Networks, "Fastiron LS Series," 2008, <http://cpssales.com/documents/Foundry-Brocade/Foundry-FastIron-LS-Series-Datasheet.

(Continued)

*Primary Examiner* — Hadi Armouche
*Assistant Examiner* — Bryan Wright (57) ABSTRACT

A method for applying a host security service to a network is described herein. The network may include a host device and a network device. The network device may receive a request for security-based filtering. The request includes filtering parameters that restrict traffic between the host device and the network device. It is determined whether the filtering parameters conflict with an initial filtering configuration. The filtering parameters may be applied to traffic through the network device.

18 Claims, 5 Drawing Sheets

(56) References Cited

U.S. PATENT DOCUMENTS

| | | | |
|---|---|---|---|
| 2009/0240645 A1* | 9/2009 | Cowham | 706/48 |
| 2010/0031358 A1 | 2/2010 | Elovici et al. | |
| 2010/0071063 A1 | 3/2010 | Wang et al. | |
| 2011/0055916 A1* | 3/2011 | Ahn | 726/13 |
| 2013/0081102 A1* | 3/2013 | Beauvais et al. | 726/1 |

OTHER PUBLICATIONS

International Search Report and Written Opinion, PCT/US2010/030755, Feb. 28, 2012.

International Preliminary Report on Patentability, International Application No. PCT/US2010/043265, Feb. 7, 2013.

* cited by examiner

IMPLEMENTING A HOST SECURITY SERVICE BY DELEGATING ENFORCEMENT TO A NETWORK DEVICE

I. BACKGROUND

With the rapid growth of computer network technology in general, network security has become a major concern. Security in a networked environment is commonly implemented using a firewall, a server or appliance configured to detect threats to prevent certain types of unauthorized network communications such as computer viruses.

A RADIUS server generally handles authentication on a switch. RADIUS-attributes are applied at the completion of authentication or re-authentication. As such, it may not be possible to modify in real-time any filters applied via the RADIUS-attributes. Additionally, threat filtering may be applied by a threat detection server or appliance, for example via simple network management protocol (SNMP). Although SNMP may be used to alter a switch configuration after a threat is detected, the threat detection rules used by the server may be generalized to a class of device in order to handle multiple sampling streams simultaneously. As such, the threat detection rules may not be host device-specific. Moreover, firewalls may be configured to intercept traffic at a gateway between two networks to check data packets, and to block unwanted traffic from entering or exiting the network. One type of firewall runs on a gateway device positioned on the boundary between two networks, such as a router. These types of network security provide protection to the network from attackers and rogue devices but may not directly protect host devices from the network.

Another type of firewall is a personal firewall which is typically implemented as a software application running on a personal computer (PC) or other host device connected to the network, for example, via a network switch. The personal firewall filters network traffic for a single device. However, filtering at the host device may consume significant resources. Resource consumption may be heightened in an attack scenario for example during a denial of service (DOS) attack.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Network devices such as switches provide connectivity to a variety of host devices in a network. Security services in a networked environment may be provided by a division of responsibilities between network devices and host devices. Once a host device has detected a threat, additional security-based filtering parameters may be determined and provided to a network device for enforcement. In other words, a host security service is extended to a network. The security-based filters may be dynamically modifiable and device-specific.

A method for applying a host security service to a network is described herein. The network may include a host device and a network device. The network device may receive a request for security-based filtering. The request includes filtering parameters that restrict traffic between the host device and the network device. It is determined whether the filtering parameters conflict with an initial filtering configuration. The filtering parameters may be applied to traffic through the network device.

Figure 1:
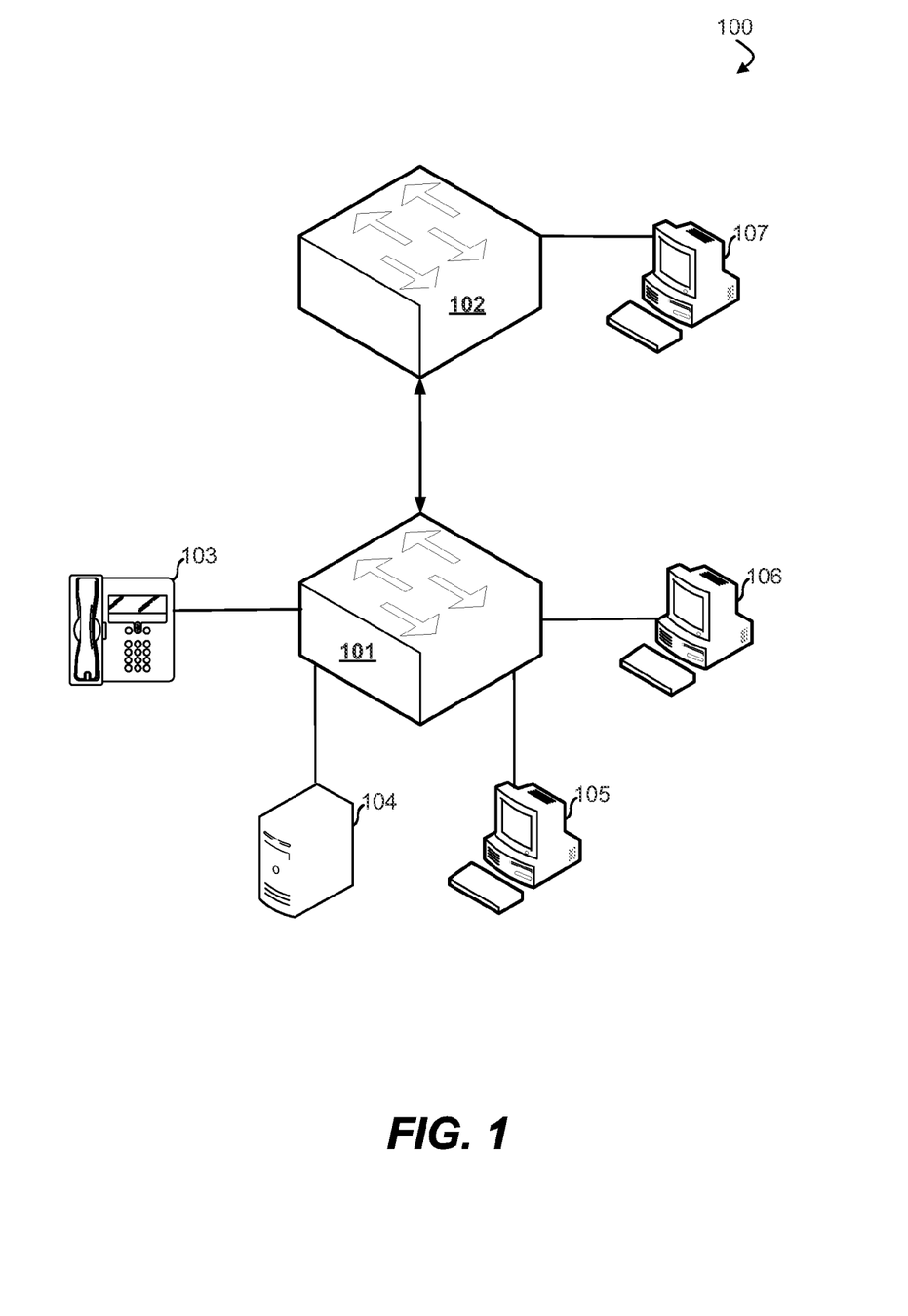
FIG. 1 is topological block diagram of a network system in accordance with an embodiment of the invention.

FIG. 1 is topological block diagram of a network system 100 in accordance with an embodiment of the invention. Network system 100 includes a network switch 101, a network switch 102, and various host devices, which include an internet-protocol (IP) phone 103, a server 104, a host computer 105, a host computer 106, and a host computer 107.

Network switch 101 is operatively coupled to network switch 102. Network switch 101 may be an edge device. As used herein, an edge device is a network switch, router, or other network device on the edge of a network. Host devices connect directly to the edge device via an edge port. As used herein, an edge port is a port of an edge device. Network switch 101 includes multiple edge ports, which connect to IP phone 103, server 104, host computer 105, and host computer 106.

Network switch 102 is operatively coupled to network switch 101. Additionally, network switch 102 includes multiple ports, one of which connects to host computer 107.

In one embodiment, network switches 101 and 102 are configured to process and transfer data in a network. Additionally, one or more of network switches 101 and 102 are further configured to receive a request for security-based filtering, determine whether the requested filtering may be performed, and to apply the requested security-based filters to the ingress and/or egress network traffic through the respective switch. As used herein, security-based filtering may include parameters, for example in an access control list (ACL), that specify the criteria used by a network switch, such as network switches 101 and 102, to deny (e.g., drop) IP packets traversing the interface of the network switch. The parameters and requests for filtering are determined by clients or host devices for enforcement by the network switch. As such, the host devices running security software may augment their network security by enlisting participation from the network switch.

IP phone 103 is operatively coupled to network switch 101 and is configured to allow telephone calls to be made over an IP network using, for example, Voice over IP (VoIP) transmission. IP phone 103 may be further configured to generate a request for security-based filtering and to transmit the request to an edge device, such as network switch 101 for enforcement. The request may include an ACL with one or more parameters restricting communication between IP phone 103 and the valid VoIP server. In one embodiment, the request is generated after an initial configuration between IP phone 103 and the VoIP server.

In one embodiment, parameters in the request may restrict access to and/or from IP phone 103. For example, ingress packets from IP phone 103 to network switch 101 may be limited to those which include a destination IP address of a valid server of a VoIP service provider (hereinafter, "VoIP server"). Similarly, egress packets which are destined for IP phone 103 may be restricted to those which include a source IP address from the valid VoIP server.

Moreover, a parameter in the request may limit egress packets which are destined for IP phone 103 to VoIP traffic only. For example, the parameter may specify that egress packets with a destination address field of IP phone 103 and with other header information identifying the packet as VoIP traffic may be delivered to IP phone 103. This may be employed, for example, in a busy network to limit the traffic that is sent to a VoIP device such as VoIP phone 103, thereby reducing packet processing for the VoIP device.

Server 104 is operatively coupled to network switch 101. Server 104 may be a mail server configured to receive incoming email from local users and remote senders and forward outgoing email for delivery. Server 104 may be further configured to generate a request for security-based filtering and to transmit the request to an edge device, such as network switch 101 for enforcement.

In one embodiment, parameters in the request may restrict access to and/or from server 104. For example, where server 104 is an email server, the parameters may restrict all non-email traffic on ingress and/or egress to and/or from server 104. Simple mail transport protocol (SMTP) uses TCP port 25 to send email traffic. As such, the parameter may restrict all traffic destined for server 104 other than the traffic of TCP port 25. In one embodiment, the request is generated after an initial configuration between server 104 and network switch 101.

Computer host 105 is operatively coupled to network switch 101. Computer host 105 may be a personal computer, server, or other computing device. Computer host 105 may be configured to detect a threat to the device and determine security-based filtering parameters to address the threat. For example, computer host 105 may include a security application, such as a personal firewall, which denies network traffic based on a security policy and/or performs intrusion detection, or anti-virus software, which prevents, detects, and removes malware. Computer host 105 may be further configured to generate a request for security-based filtering and to transmit the request to an edge device, such as network switch 101 for enforcement.

In operation, the security application may detect the presence of malware in computer host 105 and may engage in a process by which infected computer host 105 is quarantined from network 100. In response to the detected threat, a quarantine process may include determining parameters which isolate or segregate infected computer host 105 from network 100. In the case the detected threat is a computer virus, the parameters may specify that all ingress traffic from infected computer host 105 to network switch 101 be limited. Should the detected threat be a Trojan horse or other non-self-replicating malware that facilitates unauthorized access to computer host 105, the parameters may specify that all egress traffic (e.g., traffic destined for computer host 105) originating from a source IP address of a hacker associated with the Trojan horse be blocked.

In another embodiment, the security application detects the presence of unsolicited bulk email (email spam) at TCP port 25 of computer host 105. In response to the detected threat, a request may be generated including an ACL with one or more parameters restricting egress traffic destined for computer host 105 at TCP port 25. A malicious user may leverage this type of ACL by purposefully sending the computer host 105 a spam email, thereby triggering the generation of the request, thereby blocking email traffic from TCP port 25. This may, in turn, create a denial of service (DOS) for computer host 105. To abate such malicious action, safeguards may be put in place. For example, after computer host 105 detects the presence of email spam, the generated request may include an ACL with parameters that specify a rate limit for traffic originating from the sender of the email spam. In another embodiment, the parameters may specify a rate limit for traffic at TCP port 25, for example if the sender is not known. As such, computer host 105 may continue to receive traffic but at a reduced rate. The request may be transmitted to network switch 101 for enforcement.

In another embodiment, the security application may detect suspicious scanning traffic being received by computer host 105 from one or more suspect source IP addresses. In response to the detected threat, a parameter which blocks traffic originating from the one or more suspect source IP addresses and destined to computer host 105 may be determined.

A request including the parameter(s) may be generated and transmitted to network switch 101 for enforcement. The division of responsibility between a host and a network device (e.g., a network switch) in implementing the security service improves the performance of the security service. Typically, firewalls that reside in a host device, such as a PC, are software-based, i.e., the host device processes the packets in software before knowing whether the packet can be passed to higher-level applications or dropped. Since typical network switch ACLs are applied in hardware, delegating the enforcement portion (e.g., applying the filtering parameters in the ACLs) of the security service to the network switch enables the network switch to analyze and drop or forward traffic at line rate. As such, the performance of the security service is greatly improved.

In another embodiment, network switch 101 may off-load the enforcement to another network device, such as network switch 102 for enforcement. In one embodiment, switch 101 may detect a filtering condition and in response, may determine filtering parameters and generate an off-load request for filtering. The off-load request, which may include an ACL including the filtering parameters, may be transmitted to another network device, such as switch 102, for enforcement. The filtering parameters may restrict traffic between network switch 102 and one or more host devices and/or between network switch 101 and network switch 102. A filtering condition may be a same or similar filtering parameter that is imposed on all ports of the network device. For example, network switch 101 may receive requests from each of host devices IP phone 103, server 104, host computer 105, and host computer 106 which collectively blocks egress traffic across all ports of network switch 101, such that if network switch 101 were to receive any packets, the packets would all be dropped. Rather than applying the ACL across all ports of switch 101, it may be more efficient for network switch 101 to detect the filtering condition and generate a request for filtering for enforcement by network switch 102. The request may include an ACL with one or more filtering parameters that limits egress traffic on the port of network switch 102 that connects to switch 101. In one embodiment, the parameters may be determined based on the nature of the detected threat.

A malicious host wishing to attack the network may rely on "spoofing" or otherwise using a faked network address to masquerade as another host. Using this technique, the malicious host can launch denial of service (DoS) attacks, bypass access control mechanisms, or otherwise disrupt the network. For example, computer host 105 may be a malicious host which sends a request for additional filtering to network switch 101. The request may block all ingress and egress traffic associated with computer host 106 and may appear to be sent from computer host 106. If the request is applied at network device 101, computer host 106 may be the victim of a DoS attack. To abate such circumstances, hosts and network devices may authenticate themselves with one another. The authenticated hosts may communicate with the network devices in a secure communication channel. For example, authentication credentials under IEEE 802.1x, IEEE 802.1AE MAC security standard (MACsec), or other standard may be satisfied prior to enacting the security service.

The present invention can also be applied in other network topologies and environments. Network system 100 may be any type of network familiar to those skilled in the art that can support data communications using any of a variety of commercially-available protocols, including without limitation TCP/IP, SNA, IPX, AppleTalk, and the like. Merely by way of example, network system 100 can be a local area network (LAN), such as an Ethernet network, a Token-Ring network and/or the like; a wide-area network; a logical network, including without limitation a logical private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
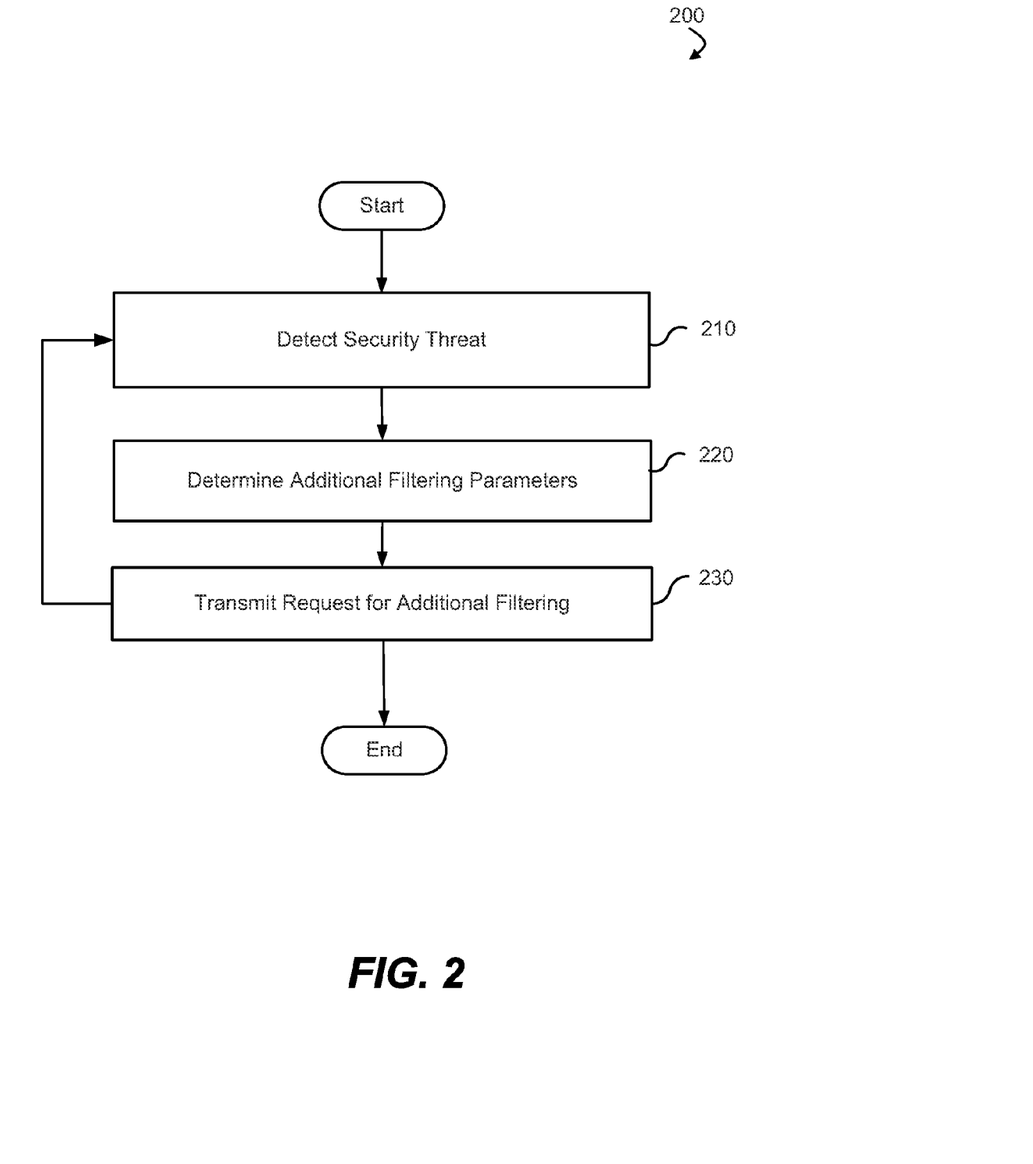
FIG. 2 is a process flow diagram for requesting security filtering in accordance with an embodiment of the invention.

FIG. 2 is a process flow diagram for requesting security filtering in accordance with an embodiment of the invention. The depicted process flow 200 may be carried out by execution of one or more sequences of executable instructions. In another embodiment, the process flow 200 is carried out by components of a networked device, an arrangement of hardware logic, e.g., an Application-Specific Integrated Circuit (ASIC), etc. For example, one or more steps of process flow 200 may be performed by a security module of a host device (e.g., IP phone, server, personal computer, end station, or other computer).

The host device may be operatively coupled to a network via a network device, such as a network switch. A security module of the network device and the security module of the host device may be initially configured with filtering parameters to enforce a security policy. The security policy may be generalized to a class of device, rather than specific to the host device. At step 210, a security threat to the host device may be detected. For example, malware, suspicious scanning activities, spam, or other security threat may be detected by security software running on the host device.

At step 220, additional filtering parameters may be determined. Used in conjunction with the initial security-based parameters, the additional filtering parameters may further restrict the traffic between the host device and the network device. The additional filtering parameters may be determined based on the nature of the detected security threat. In one embodiment, the additional filtering parameters may be any type of security-based filtering such as, but are not limited to, ingress and/or egress IP filtering, ingress and/or egress rate-limiting, stateful firewall protection, packet inspection, and the like.

A request for additional filtering may be generated and transmitted at step 230, for example, upon detection of the security threat. The request may include an ACL with the additional filtering parameters. The ACL may be any one of known ACL variations, such as a standard ACL, static port ACL, dynamic port ACL, rate-limit port ACL which is an ACL that allows rate-limits to be enforced on a per-port basis, VLAN ACL which is an ACL that applies restrictions to IP traffic entering the network device on a particular VLAN interface, extended ACL which specifies quality of service (QOS), type of service (TOS), and/or precedence restrictions, etc.

The request may be transmitted to the network device, such as an edge network switch at step 230. As such, the host device may proactively defend against known threats and may dynamically respond to those threats by requesting the additional filters in real time, e.g., as the threats are detected. Moreover, the filters may be specific to the host device, rather than being generalized to a class of devices. The host device may be able to modify or remove any filter that was created by a request from the host device itself.

Figure 3:
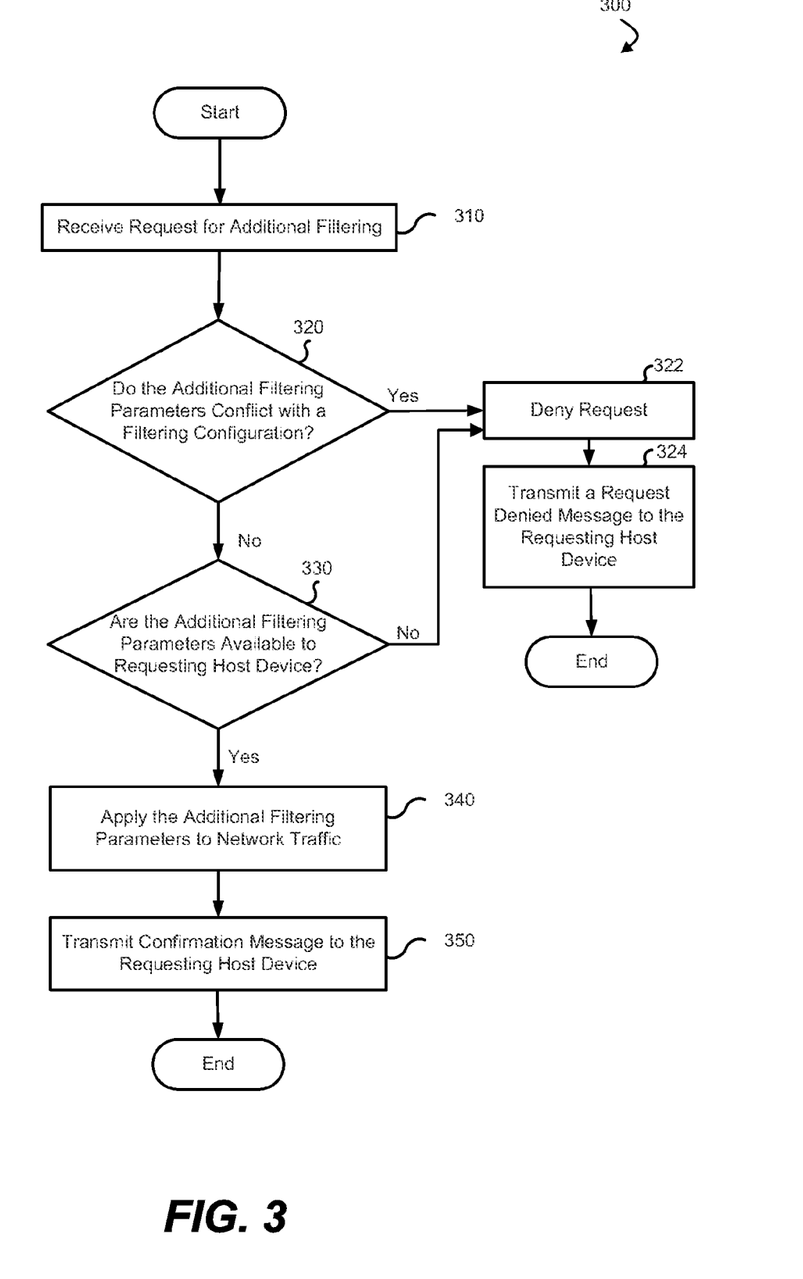
FIG. 3 is a process flow diagram for applying security filtering in accordance with an embodiment of the invention.

FIG. 3 is a process flow diagram for applying security filtering in accordance with an embodiment of the invention. The depicted process flow 300 may be carried out by execution of one or more sequences of executable instructions. In another embodiment, the process flow 300 is carried out by components of a networked device, an arrangement of hardware logic, e.g., an Application-Specific Integrated Circuit (ASIC), etc. For example, one or more steps of process flow 300 may be performed by a security module of a network device (e.g., network switch, router, etc.) and/or a multi-port controller ASIC of the network device. The security service provided by the security module may be disabled/enabled per-network device or per-port of a network device via a network device configuration, for example, via RADIUS attributes.

The network device may be operatively connected to a host device. The security module of the network device and a security module of the host device may be initially configured with filtering parameters to enforce a security policy. At step 310, a request for additional security-based filtering may be received. For example, the network device may listen for requests using a layer 2 networking protocol, such as link layer discovery protocol (LLDP). The request may include an ACL specifying additional filtering parameters that restrict traffic between the host device and the network device.

At step 320, it is determined whether the additional filtering parameters from the request conflict with the filtering configuration. Conflicts may arise, for example, where one or more of the additional filtering parameters are not more restrictive than the filtering configuration. For example, the request may be denied if the filtering would lessen the statically or dynamically configured filtering policy or other filtering assigned by a RADIUS server, a threat detection server or appliance via, for example, SNMP. In one embodiment, the configuration serves as a baseline for security filtering.

Where a conflict is detected, processing continues to step 322 where the request for additional filtering is denied. In one embodiment, the request may include multiple filtering parameters. If it is determined that a subset of the filtering parameters conflict with the filtering configuration, the conflicting subset may be denied and processing for the non-conflicting filtering parameters may continue to step 330. At step 324, a request denied message is generated and transmitted to the requesting host device.

Where no conflict is detected, it is determined whether the additional filtering parameters are available to the requesting host device at step 330. In one embodiment, a finite amount of ACL resources are provided in the hardware of the network device, such as a network switch. As such, the determination of availability may entail determining whether ACL resources in the network device are available to apply the non-conflicting filtering parameters. If the filtering parameters are unavailable to the requesting host device, the request is denied at step 322 and a request denied message is transmitted to the requesting host device at step 324.

Otherwise, processing continues to step 340 where the additional filtering parameters are applied to the network traffic passing through the network device. In some embodiments, a confirmation message may be generated and transmitted to the requesting host device at step 350. The confirmation message may indicate that the request for additional filtering is being honored by the network device. In one embodiment, the performance of the host device is improved by sharing the enforcement portion of the security service with the network device.

Figure 4:
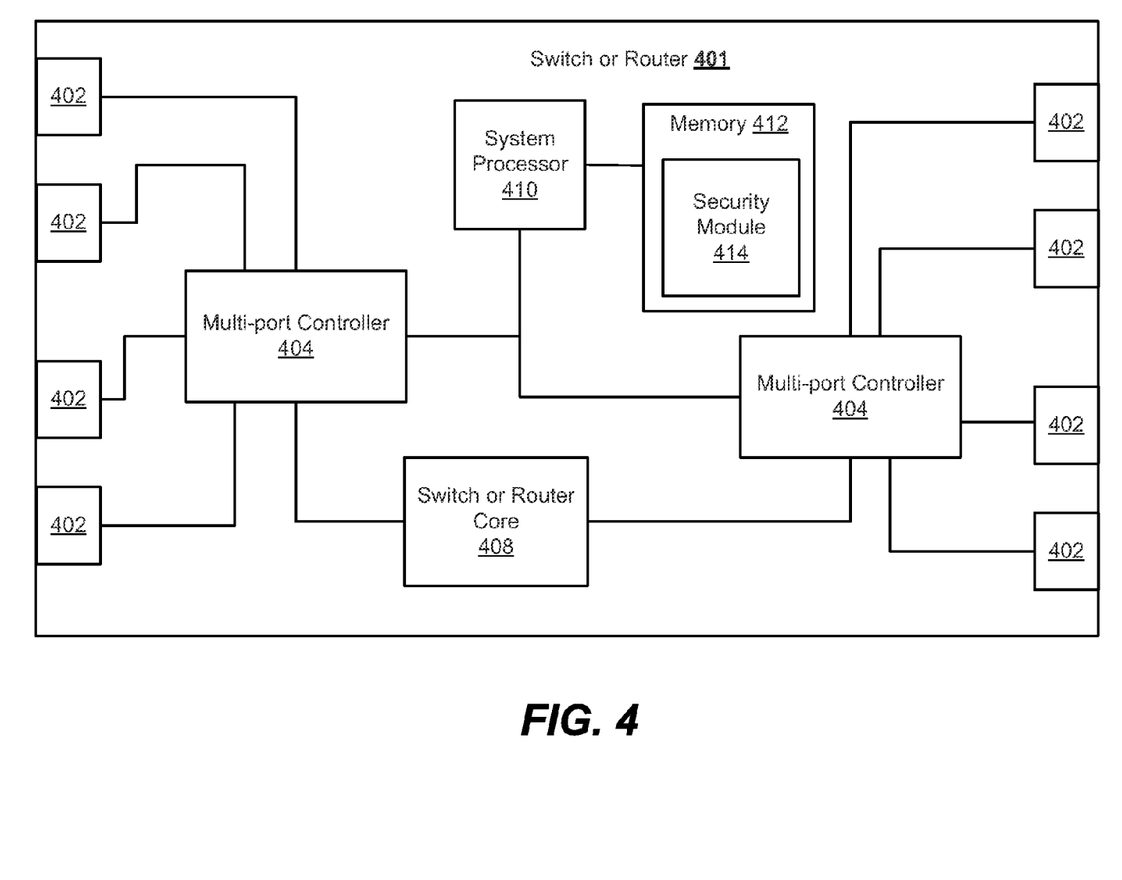
FIG. 4 is a block diagram of an exemplary switching or routing device in accordance with an embodiment of the invention.

FIG. 4 is a block diagram of an exemplary switching or routing device in accordance with an embodiment of the invention. Switching or routing device 401 may be configured with multiple ports 402. One or more of multiple ports 402 is an edge port configured to receive a request for security-based filtering. The ports 402 may be controlled by one or more multi-port controller ASICs (application specific integrated circuits) 404, which is configured to filter network packets according to the filtering parameters.

The device 401 may transfer (i.e. "switch" or "route") packets between ports by way of a conventional switch or router core 408 which interconnects the ports. A system processor 410 and memory 412 may be used to control device 401. For example, a security module 414 may be implemented as code in memory 412 which is being executed by the system processor 410 of a network device. Security module 414 may be configured to determine whether the filtering parameters conflict with an initial filtering configuration and to program or otherwise configure multi-port controller ASICs 404 to apply the filtering parameter(s).

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage medium that are suitable for storing a program or programs that, when executed, for example by a processor, implement embodiments of the present invention. Accordingly, embodiments provide a program comprising code for implementing a system or method as claimed in any preceding claim and a machine readable storage medium storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Figure 5:
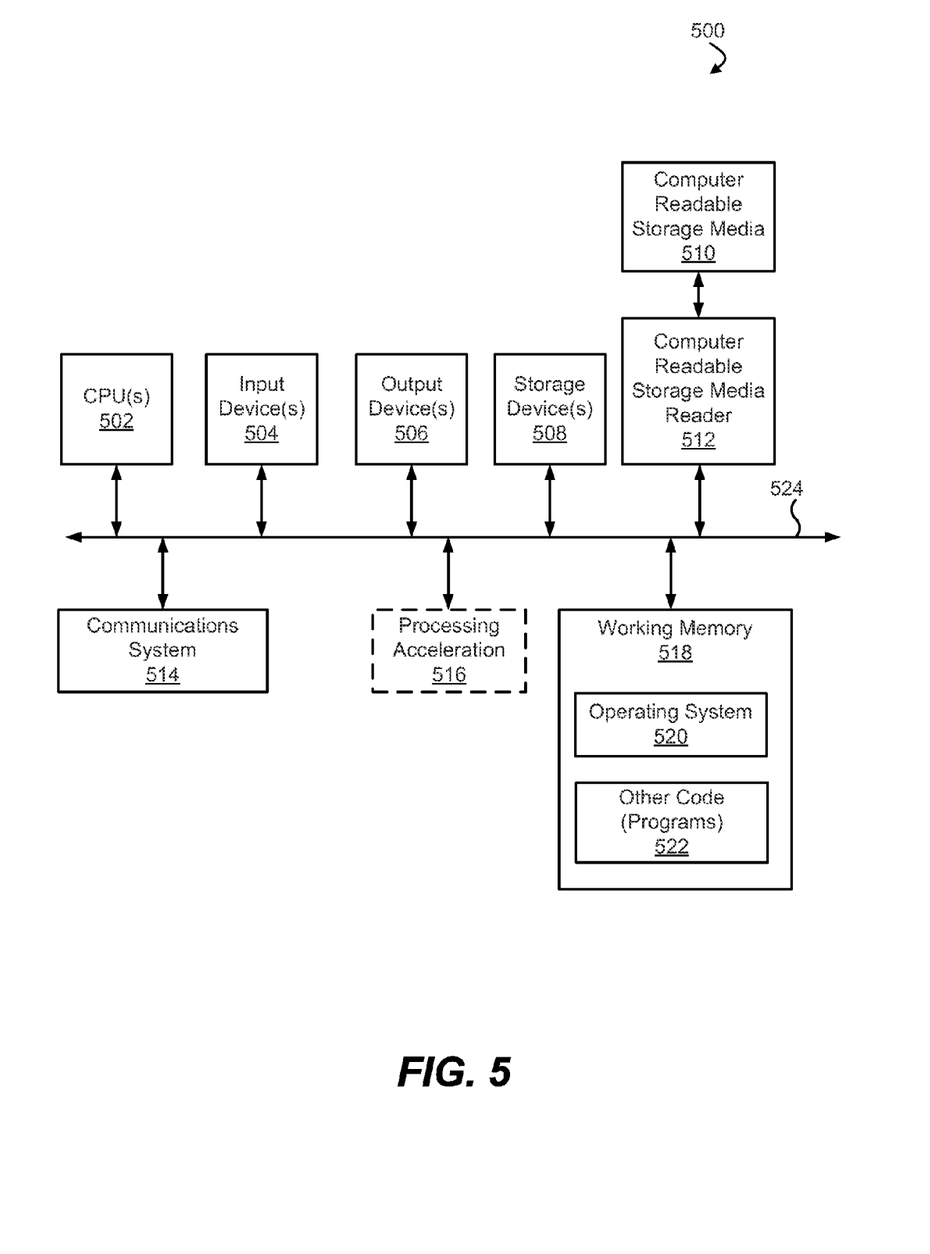
FIG. 5 illustrates an exemplary computer system in which various embodiments of the present invention may be implemented.

FIG. 5 illustrates an exemplary computer system 500 in which various embodiments of the present invention may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and in combination with storage device(s) 508 in one embodiment) comprehensively representing remote, local, fixed, and/or removable storage devices plus storage media for temporarily and/or more permanently containing, storing, transmitting, and retrieving computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for storing a plurality of instructions, or portions of instructions, can include any appropriate media known or used in the art. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method for applying a host security service to a network, the network including a host device and a network device, the method comprising:
receiving, by the network device, a request for additional security-based filtering from a host device upon detection of a security threat, the request including filtering parameters determined based on the nature of the detected security threat at the host device;
determining, by the network device, whether one or more of the filtering parameters conflict with an initial filtering configuration at the network device;
if a subset of the filtering parameters conflict with the initial filtering configuration, denying the request for the conflicting subset and continuing to process the request for non-conflicting filtering parameters; and
applying, by the network device, the non-conflicting filtering parameters to traffic through the network device.

2. The method of claim 1, further comprising:
detecting a filtering condition; and
generating an off-load request including one or more filtering parameters that restrict traffic between the network device and a second network device in the network; and
transmitting the off-load request to the second network device.

3. The method of claim 1, wherein the request for security-based filtering includes an access control list and wherein the request for security-based filtering is generated by the host device upon detection of a security threat.

4. The method of claim 1, further comprising:
denying the request for security-based filtering if the filtering parameters conflict with the initial filtering configuration; and
transmitting a message indicating the request for security-based filtering is denied.

5. The method of claim 1, wherein determining whether the filtering parameters conflict with an initial filtering configuration comprises:
determining that the one or more of the filtering parameters are not more restrictive than the initial filtering configuration.

6. The method of claim 1, further comprising:
upon determining that one or more of the filtering parameters do not conflict, determining whether resources of the network device are available to apply the one or more filtering parameters to traffic through the network device.

7. The method of claim 1, wherein the host device is coupled to an edge port of the network device.

8. A network device for use in a network, the network including a host device and the network device, the network device comprising: an edge port device configured to receive a request for additional security-based filtering from a host device upon detection of a security threat, the request including filtering parameters determined based on the nature of the detected security threat at the host device; a security engine coupled to the edge port device, wherein the security engine is configured to determine whether one or more of the filtering parameters conflict with an initial filtering configuration at the network device; if a subset of the filtering parameters conflict with the initial filtering configuration, denying the request for the conflicting subset and continuing to process the request for non-conflicting filtering parameters; and
a switch controller coupled to the security engine, wherein the switch controller is configured to filter network packets according to the non-conflicting filtering parameters.

9. The device of claim 8, wherein the security engine is further configured to: detect a filtering condition; and generate an off-load request including one or more filtering parameters that restrict traffic between the network device and a second network device in the network; and transmit the off-load request to the second network device.

10. The device of claim 8, wherein the request for security-based filtering includes an access control list, and wherein the request for security-based filtering is generated by the host device upon detection of a security threat.

11. The device of claim 8, wherein the security engine is further configured to: deny the request for security-based filtering if the filtering parameters conflict with the initial filtering configuration; and transmit a message indicating the request for security-based filtering is denied.

12. The device of claim 8, wherein the security engine is further configured to determine that the one or more of the filtering parameters are not more restrictive than the initial filtering configuration.

13. The device of claim 8, wherein the security engine is further configured to determine whether resources of the network device are available to apply the one or more filtering parameters to traffic through the network device, upon determining that one or more of the filtering parameters do not conflict.

14. A method for applying a host security service to a network, the network including a host device and a network device, the method comprising:
detecting, by the host device, a security threat;
determining, by the host device, one or more additional filtering parameters that restrict traffic between the host device and the network device;
generating, by the host device, a request for security-based filtering including the one or more additional filtering parameters; and
transmitting, by the host device the request to the network device;
determining, by the network device, whether the one or more additional filtering parameters conflict with an initial filtering configuration at the network device;
if a subset of the filtering parameters conflict with the initial filtering configuration, denying the request for the conflicting subset and continuing to process the request for non-conflicting filtering parameters;
applying, by the network device, the non-conflicting filtering parameters to traffic through the network device.

15. The method of claim 14, wherein the request includes an access control list.

16. The method of claim 1, wherein the host device is a personal computer and the network device is a switch.

17. The device of claim 8, wherein the host device is a personal computer and the network device is a switch.

18. The method of claim 14, wherein the host device is a personal computer and the network device is a switch.

* * * * *